May 10, 1955  J. A. SKUPAS  2,707,795
SPRING CASTER

Filed July 28, 1951  2 Sheets-Sheet 1

INVENTOR.
JOHN A. SKUPAS.
BY
Lockwood, Hahn, Galt & Woodard,
ATTORNEYS.

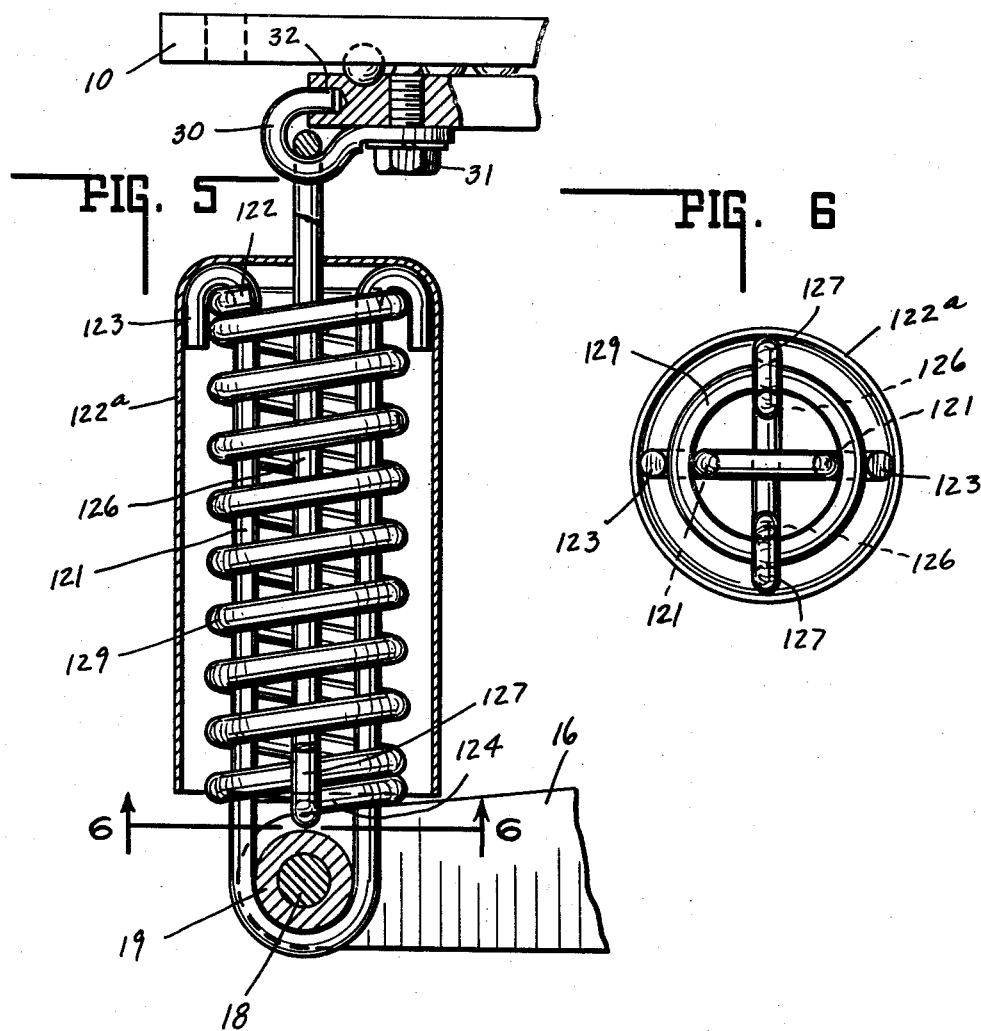

United States Patent Office 2,707,795
Patented May 10, 1955

2,707,795
SPRING CASTER

John A. Skupas, Evansville, Ind., assignor to Faultless Caster Corporation, Evansville, Ind., a corporation Application July 28, 1951, Serial No. 239,057

1 Claim. (Cl. 16—44)

This invention relates to a spring caster, and particularly of a character to absorb and dampen vibrations due to the caster passing over extremely rough and irregular surfaces.

It is the principal object of the invention to provide a caster of the shock absorbing type which may be readily applied to the standard casters without change or alteration in their structure, and which will be of sturdy, simple and economic design. Thus, according to this invention the standard caster wheel may be removed from its horn and remounted on a shock absorbing unit which in turn may be assembled with the horn in place thereof. Accordingly, the shock absorbing unit of this invention may be readily introduced into a standard caster, either of the swivel or stationary type such as to absorb and dampen high impact shock loads enabling the vulnerable parts of the caster, such as the wheel tread, kingpin, axle and raceways—to more readily sustain such load forces as may be encountered under operating conditions. Wherein this assembly is introduced into the caster, a truck or the like carried thereby when loaded and accelerated over rough surfaces, will carry the load in a horizontal line parallel to the theoretical line of an even floor, road or runway irrespective of high and low spots therein, and without bounce and bump.

The invention further contemplates such a shock absorbing assembly employing a compression spring with a drawbar arrangement enabling the use of tension action in absorbing shock and dampening vibrations, the simplicity of design providing for ease of replacement of such spring in the event of it being damaged or broken. Furthermore, through the employment of a fulcrumed lever arm the force requirement on the spring is materially reduced, thus increasing its spring life.

A further feature of the invention resides in the removable connection between the assembly and the truck and caster mounting, including the employment of an anchoring eye hook therefor such as to simplify its incorporation in the standard caster mounting as well as disassembly therefrom.

The full nature of the invention will be understood from the accompanying drawings and the following description and claim:

Fig. 5 is a side view of the shock absorbing assembly as in Fig. 1, showing a modified form.

Fig. 6 is a section taken on the line 6—6 of Fig. 5.

Figure 1:
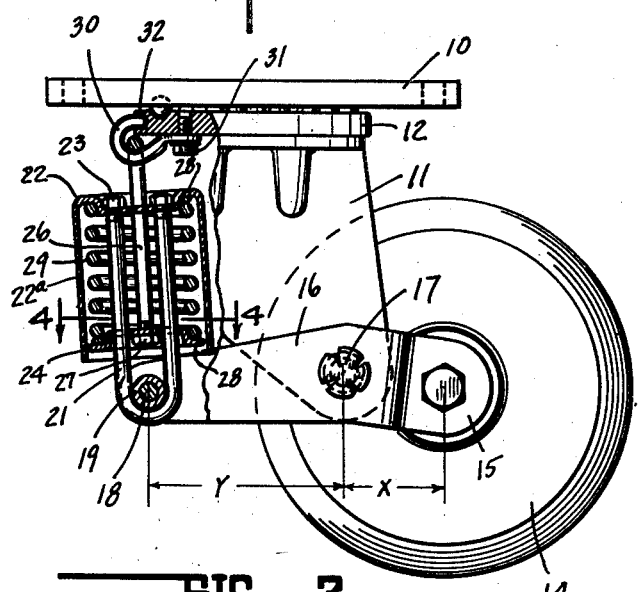
Fig. 1 is a side view of a caster and shock absorbing assembly with parts removed and parts in section.
Figure 2:
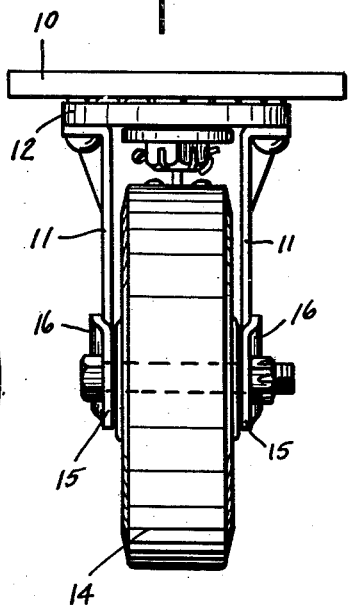
Fig. 2 is a rear elevation of the caster and mounting shown in Fig. 1.
Figure 3:
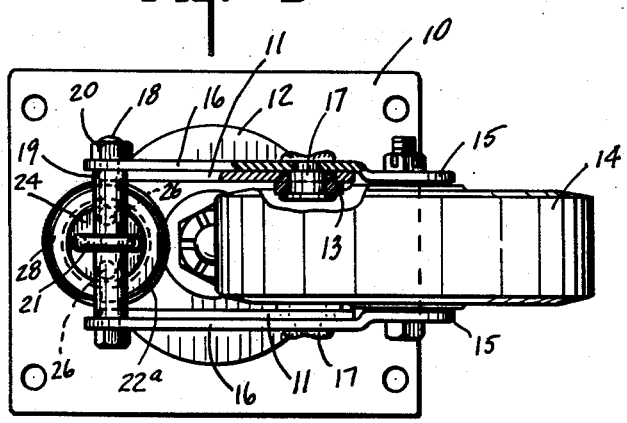
Fig. 3 is a bottom plan view of the caster and mounting shown in Fig. 2.
Figure 4:
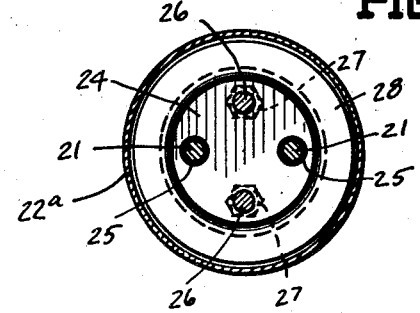
Fig. 4 is an enlarged plan view of one of the retaining caps taken on the line 4—4 of Fig. 1 with the spring removed.

In the drawings, by way of illustration of the invention there is shown a caster mounting plate 10 adapted to be secured to the underside of a truck bed. Said mounting plate carries a depending caster horn 11 provided with a swivel head 12 of the usual and standard type. The lower end of said horn is provided with the bearings 13 adapted normally to receive the caster wheel 14, but according to this invention and as herein shown, the caster wheel 14 is removed from the horn and rotatably mounted in the shock absorbing assembly between the free ends 15 of the levers 16 for free rotation thereon. In place of the usual caster wheel mounting in the bearings 13 of the horn the levers 16 are fulcrumed therein on the supporting studs 17 mounted in the bearings to permit of free oscillation of the levers 16 thereon.

The shock absorbing assembly includes a transverse supporting bolt 18 extending through the opposite free ends of said levers, locking them together in spaced relation between the spacer 19 and the lock nut 20 carried by said bolt.

The bolt 18 through its spacer centrally thereof is cradled in a U-shaped hanger bar 21 having its legs extending upwardly to an upper retaining cap 22. Said cap is provided with a depending skirt portion 22a such as to house the spring to provide a dust guard. The free ends of said hanger bar are adjustably connected to said retaining cap and locked therein by the nuts 23.

Slidably mounted on the opposed legs of the hanger bar there is a bearing cap 24, the legs thereof being freely slidable through and with respect to the opposed apertures 25 formed therein. Rigidly secured to said bearing cap 24 there is a drawbar 26 of similar U-shaped form having its opposed legs slidably extending through the apertures in the retaining cap 22 and with its free ends adjustably secured to the bearing cap 24 by the nuts 27.

Each of said caps 22 and 24 is formed with depressed flanges 28 adapted to receive and center the compression spring 29 urging said caps from each other and permitting them to move toward each other under yielding spring tension.

The upper looped end of the U bolt drawbar 26 is hung in an eye hook 30. The shank of said hook is secured by a bolt 31 to the underside of swivel head 12 of the caster horn, the end of the hook extending into a recess indicated at 32 in the peripheral edge of said swivel head whereby said hook which partially sustains the load will be firmly anchored at both ends.

When the caster is in operation its center of support is free to rotate or rock about the fulcrum point of the levers 16 in radians, which movement will be translated into a portion of a sine curve with the distance X as the amplitude, and the levers 16 will rotate or oscillate about its fulcrum point. Its impact or its constant force applied to the compression spring 29 will become divisible by the distance Y, thereby reducing the load requirements on the spring and thus enhancing its longevity. Accordingly, such irregularities over which the caster passes will be smoothed out in respect to the vibration or impact transmitted to the truck bed through such rocking or oscillatory movement by the spring 29.

In the modified form of the invention shown in Figs. 5 and 6 like numerals of the 100 series indicate corresponding parts as above described with respect to Figs. 1 to 4 inclusive. As shown in this modification, the spring 129 is provided with the loop 122 at its upper end and a loop 124 at its lower end. The U-shaped hanger bar 121 has its upper ends bent over U-shaped as indicated at 123 to embrace the loop end 122 of the spring and hang thereon. The drawbar 126 has its lower ends bent upwardly to embrace the loop 124 of the spring as indicated at 127 so that the spring seats therein and is supported thereby. Surrounding the assembly and supported upon the upper ends of the drawbar there is a dust guard including a depending skirt 122a.

The operation and functioning of this assembly is the same as shown in Fig. 1 other than there is no provision therein for adjustment. However, it is a more simplified structure such as to minimize the cost of production.

The invention claimed is:

A spring caster having a mounting plate and a horn depending therefrom, a lever fulcrumed intermediate its ends on said horn, a caster wheel mounted for rotation on one of the ends of said lever, a U-shaped hanger bar having upwardly extending spaced legs forming a loop at its lower end to embrace the other end of said lever, a U-shaped drawbar having downwardly extending spaced legs in parallel relation with the legs of said hanger bar and in 90° angular relation therewith, the legs of said drawbar being looped at its upper end to embrace a fitting secured to said mounting plate, a coiled compression spring surrounding said hanger bar and drawbar having annular end coils, hooked ends formed on the upper free ends of said hanger bar bent to hook over the upper coiled end of said spring, and hooked ends on the lower free ends of the legs of said drawbar bent upwardly to hook over the lower coil of said spring, whereby said compression spring will be confined between the hooked ends of said bars.

References Cited in the file of this patent

UNITED STATES PATENTS

| | | |
|---|---|---|
| 201,323 | Brown | Mar. 19, 1878 |
| 311,260 | Rohrer | Jan. 27, 1885 |
| 553,214 | Patrick | Jan. 14, 1896 |
| 2,282,506 | Wachter | May 12, 1942 |
| 2,582,716 | Nelson | Jan. 15, 1952 |

FOREIGN PATENTS

| | | |
|---|---|---|
| 536,445 | Great Britain | May 15, 1941 |